(12) United States Patent
Iwahata et al.

(10) Patent No.: US 12,478,083 B2
(45) Date of Patent: Nov. 25, 2025

(54) PACKAGED CARAMELIZED ONION CHUTNEY AND METHOD FOR PRODUCING SAME

(71) Applicant: House Foods Corporation, Osaka (JP)

(72) Inventors: Shinichi Iwahata, Higashiosaka (JP); Masato Nakanishi, Higashiosaka (JP); Shigeki Satomi, Higashiosaka (JP)

(73) Assignee: House Foods Corporation, Osaka (JP)

( * ) Notice: Subject to any disclaimer, the term of this patent is extended or adjusted under 35 U.S.C. 154(b) by 354 days.

(21) Appl. No.: 17/908,474

(22) PCT Filed: Mar. 1, 2021

(86) PCT No.: PCT/JP2021/007615
§ 371 (c)(1),
(2) Date: Aug. 31, 2022

(87) PCT Pub. No.: WO2021/177204
PCT Pub. Date: Sep. 10, 2021

(65) Prior Publication Data
US 2023/0094661 A1 Mar. 30, 2023

(30) Foreign Application Priority Data
Mar. 2, 2020 (JP) ................................. 2020-034851

(51) Int. Cl.
*A23L 27/16* (2016.01)
(52) U.S. Cl.
CPC .................................... *A23L 27/16* (2016.08)

(58) Field of Classification Search
CPC ........................................................ A23L 27/16
USPC ........................................................ 426/534
See application file for complete search history.

(56) References Cited

FOREIGN PATENT DOCUMENTS

| | | | |
|---|---|---|---|
| CN | 2795088 Y | 7/2006 | |
| CN | 103637253 A | * 3/2014 | ........... A23L 1/0107 |
| JP | S63-167756 A | 7/1988 | |
| JP | 2001-190240 A | 7/2001 | |
| JP | 2006-333836 A | 12/2006 | |
| JP | 2012-000046 A | 1/2012 | |
| JP | 2016-221864 A | 12/2016 | |
| JP | 2019165670 A | * 10/2019 | |
| TR | 201501241 A | * 12/2015 | |

OTHER PUBLICATIONS

Translation of JP-2019165670-A (Year: 2019).*
Translation of TR-201501241-A (Year: 2015).*
Translation of CN-103637253-A (Year: 2014).*
Chinese Office Action dated Aug. 31, 2023 issued in Chinese Patent Application No. 202180018406.0.
International Search Report issued in corresponding International Patent Application No. PCT/JP2021/007615 dated May 11, 2021.

* cited by examiner

*Primary Examiner* — Brent T O'Hern
(74) *Attorney, Agent, or Firm* — Morgan, Lewis & Bockius LLP

(57) ABSTRACT

The present disclosure provides a packaged caramelized onion chutney with a good flavor and a method for producing the same.

16 Claims, No Drawings

PACKAGED CARAMELIZED ONION CHUTNEY AND METHOD FOR PRODUCING SAME

TECHNICAL FIELD

The present invention relates to a packaged caramelized onion chutney with a preferred flavor and a method for producing the same.

BACKGROUND ART

When onions are cooked, their sharpness is reduced and sweet and roasted flavor is increased to create a unique flavor. Thus, cooked onions, including caramelized onion and roasted onion, have been used as a food material for not only home use but also commercial use. For example, Patent Literature 1 discloses a method for producing roasted onion with stable quality, comprising heating onion with a moisture content of 80 to 30% at 80° C. or more and then heating it in a package at a temperature of 100° C. or more.

Patent Literature 2 discloses a method for producing saute onion, the method comprising the steps of: subjecting onion to hot water extraction to separate a sugar-containing aqueous extract solution and solid onion; concentrating the sugar-containing aqueous extract solution which has been separated until the sugar content reaches at least 60% Brix; and sauteing the concentrated sugar-containing aqueous extract solution and the solid onion.

Patent Literature 3 discloses a method for producing onion finished in heat treatment, comprising heating onion under pressure conditions and then heating the onion in an open system. Patent Literature 3 also discloses that a retort pouch may be used in heating under pressure conditions.

Patent Literature 4 discloses a method for producing a caramelized onion-containing chutney comprising the steps of: (1) preparing an onion paste by vacuum concentrating raw onion puree; and (2) heating the onion paste together with oil/fat to prepare caramelized onion. Patent Literature 4 discloses that the method of heating in the step (2) comprises heating the mixture in a hermetically sealed retort pouch under pressure conditions.

CITATION LIST

Patent Literature

Patent Literature 1: JP Patent Publication (Kokai) No. 63-167756
Patent Literature 2: JP Patent Publication (Kokai) No. 2006-333836
Patent Literature 3: JP Patent Publication (Kokai) No. 2001-190240
Patent Literature 4: JP Patent Publication (Kokai) No. 2019-165670

SUMMARY OF INVENTION

Technical Problem

An object of the present invention is to provide a packaged caramelized onion chutney with a unique sweet taste and aroma like when onion is roasted and a method for producing the same.

Solution to Problem

The present inventors have conducted intensive studies to solve the above problem, and as a result have found that a caramelized onion chutney with an excellent flavor can be prepared by heating, in a package, under pressure conditions, a raw material mixture comprising onion and lipid, in which the content of lipid is 9% by mass or more and 35% by mass or less and the content of water is 20% by mass or more and 70% by mass or less, and the following invention has been completed.

Accordingly, the present invention provides the following caramelized onion chutneys and method for producing the same.

[1] A packaged caramelized onion chutney comprising:
 a caramelized onion chutney comprising onion and lipid, wherein the content of the lipid is 9% by mass or more and 35% by mass or less and the content of water is 20% by mass or more and 70% by mass or less; and
 a package in which the chutney is sealed.

[2] The chutney according to [1], wherein the content of the onion in the chutney is 200% by mass or more and 600% by mass or less in terms of raw onion.

[3] The chutney according to [1] or [2], wherein the content of sucrose in the chutney is 1.8% by mass or more and 10% by mass or less.

[4] The chutney according to any of [1] to [3], wherein the package has an oxygen permeability of 0.1 mL/m²/day/MPa or more.

[5] The chutney according to any of [1] to [4], wherein the chutney is prepared by heating under pressure conditions in the package.

[6] The chutney according to any of [1] to [5], wherein
 the content of sucrose in the chutney is 1.8% by mass or more and 10% by mass or less,
 the package has an oxygen permeability of 0.1 mL/m²/day/MPa or more,
 the chutney is prepared by heating under pressure conditions in the package so that the maximum product temperature is 100 to 140° C. and the cooking value is 33 to 80, wherein
 the cooking value is obtained by integrating a value for a product temperature (A) [° C.], which is calculated by $10^{\{(A-120)/30\}}$, with the time of heating [minute].

[7] A method for producing a packaged caramelized onion chutney, the method comprising the steps of:
 preparing a raw material mixture comprising onion and lipid, wherein the content of the lipid is 9% by mass or more and 35% by mass or less and the content of water is 20% by mass or more and 70% by mass or less;
 placing and hermetically sealing the raw material mixture in a package; and
 heating the raw material mixture in the package under pressure conditions so that the maximum product temperature is 100 to 140° C. and the cooking value is 33 to 80, wherein
 the cooking value is obtained by integrating a value for a product temperature (A) [° C.], which is calculated by $10^{\{(A-120)/30\}}$ with the time of heating under pressure conditions [minute].

[8] The method according to [7], wherein
 the moisture content of the onion is adjusted so that the yield is 35% by mass or less, and wherein
 the content of the onion in the raw material mixture is 200% by mass or more and 600% by mass or less in terms of raw onion.

[9] The method according to [7] or [8], wherein
 the content of sucrose in the raw material mixture is 1.8% by mass or more and 10% by mass or less.

[10] The method according to any of [7] to [9], wherein the package has an oxygen permeability of 0.1 mL/m²/day/MPa or more.

[11] The method according to any of [7] to [10], wherein
the content of sucrose in the raw material mixture is 1.8% by mass or more and 10% by mass or less, and
the package has an oxygen permeability of 0.1 mL/m²/day/MPa or more.

The description encompasses the disclosure of JP Patent Application No. 2017-184019, on which the priority of the present application is based.

Advantageous Effect of Invention

The packaged caramelized onion chutney according to one or more embodiments of the present invention has an excellent, unique flavor. The chutney can give a good flavor to food to which it is mixed, and can improve preference to the food.

The method according to one or more other embodiments of the present invention can produce a packaged caramelized onion chutney having an excellent, unique flavor. Since the raw material mixture is heated under pressure conditions in a hermetically sealed package, the flavor derived from components which evaporate under open conditions can be maintained.

DESCRIPTION OF EMBODIMENTS

In the following the present invention will be described in more detail.

<Packaged Caramelized Onion Chutney>

The packaged caramelized onion chutney according to the first embodiment of the present invention comprises: a caramelized onion chutney comprising onion and lipid, wherein the content of the lipid is 9% by mass or more and 35% by mass or less and the content of water is 20% by mass or more and 70% by mass or less; and a package in which the chutney is sealed.

The "caramelized onion" as used herein refers to a food material prepared by cooking raw onion until it is caramel in color, or brown, to reduce sharpness and bitterness and increase a sweet and roasted flavor. The caramelized onion may also be referred to as roasted onion, saute onion or stir-fried onion.

The packaged caramelized onion chutney according to the present embodiment may be prepared by the steps of: preparing a raw material mixture comprising onion (dried or concentrated onion) prepared by drying or concentrating raw onion to reduce moisture content and lipid, wherein the content of the lipid is 9% by mass or more and 35% by mass or less and the content of water is 20% by mass or more and 70% by mass or less; placing and hermetically sealing the raw material mixture in a package; and heating the raw material mixture in the package under pressure conditions. Preferred embodiments of the method will be described later.

Onion in the above caramelized onion chutney may be in a form similar to dried onion or concentrated onion mixed to the raw material mixture, such as in puree, paste, minced (or diced) or sliced form. The puree form means a form prepared by grinding raw onion, and the paste form means a form prepared by concentrating (e.g., vacuum concentrating) raw onion puree.

A lipid usually used in the technical field may be used without limitation as the lipid described above. Examples thereof may be oil/fat such as palm oil, rapeseed oil, lard, beef tallow, soybean oil, coconut oil, canola oil, mustard oil, peanut oil and olive oil.

When the content of lipid in the caramelized onion chutney is 9% by mass or more and 35% by mass or less, the caramelized onion chutney has a unique sweet taste and aroma like when onion is roasted. Sulfide components, which create the flavor of caramelized onion, are efficiently extracted into lipid, and the presence of lipid provides an efficient site of chemical reaction. Therefore, lipid is considered to improve the aftertaste and koku (richness) of caramelized onion prepared. When the content of lipid is less than 9% by mass, the resultant is like boiled onion, and flavor obtained when onion is roasted cannot be sufficiently given to the caramelized onion chutney. When the content of lipid is more than 35% by mass, the taste of lipid can be detected in the caramelized onion chutney, and the unique koku (richness) of caramelized onion is less likely to be tasted.

The content of lipid in the caramelized onion chutney is preferably 10% by mass or more, more preferably 12% by mass or more, and further preferably 14% by mass or more, and preferably 35% by mass or less, more preferably 30% by mass or less, and further preferably 25% by mass or less.

The content of lipid may be measured by the ether extraction method described in the "Analytical methods for nutrients; Annex Analytical methods for nutrients Food Labeling Act General Rules, the Consumer Affairs Agency" (https://www.caa.go.jp/policies/policy/food_labeling/food-_labeling_act/pdf/foods_index_18_180119_0003.pdf).

When the content of water is 20% by mass or more and 70% by mass or less, the caramelized onion chutney has a unique sweet taste and aroma like when onion is roasted. When the content of water is less than 20% by mass, the resultant is like fried onion, and the unique koku (richness) of caramelized onion is less likely to be tasted. When the content of water is more than 70% by mass, the resultant is like boiled onion, and the above unique sweet taste and aroma cannot be tasted. The content of water in the caramelized onion chutney is preferably 30% by mass or more, more preferably 40% by mass or more, further preferably 45% by mass or more, and still more preferably 50% by mass or more, and preferably 65% by mass or less and more preferably 60% by mass or less.

The origin of water in the caramelized onion chutney is not limited, and may include water in the onion mixed as a raw material, water separately mixed thereto, and water in other raw materials.

The content of water may be measured by heat drying method under reduced pressure using a drying aid (70° C., 5 hours) described in the above "Analytical methods for nutrients; Annex Analytical methods for nutrients Food Labeling Act General Rules, the Consumer Affairs Agency."

In a preferred embodiment of the caramelized onion chutney, the content of onion is 200% by mass or more and 600% by mass or less in terms of raw onion. When the content of onion in terms of raw onion is in that range, a preferred flavor is likely to be obtained. The content of onion is preferably 220% by mass or more, more preferably 250% by mass or more, and preferably 500% by mass or less and more preferably 400% by mass or less in terms of raw onion.

In a preferred embodiment of the caramelized onion chutney, the content of sucrose is 1.8% by mass or more and 10% by mass or less. When the content of sucrose is in that range, a preferred flavor is likely to be obtained. The content of sucrose in the caramelized onion chutney is preferably 2.0% by mass or more, more preferably 2.5% by mass or more, and preferably 8% by mass or less, more preferably 7% by mass or less, and further preferably 6% by mass or less. When the content of sucrose in the caramelized onion chutney is less than 1.8% by mass, the Maillard reaction is less likely to proceed in heating under pressure conditions or in the storage period, and thus the problem of expansion of packages described later is less likely to arise, but a preferred flavor is unlikely to be obtained.

The origin of sucrose in the caramelized onion chutney is not limited, and may include sucrose in the onion mixed as a raw material, sucrose separately mixed thereto, and sucrose in other raw materials.

The content of sucrose may be measured by high speed liquid chromatography described in the above "Analytical methods for nutrients; Annex Analytical methods for nutrients Food Labeling Act General Rules, the Consumer Affairs Agency."

The caramelized onion chutney may also include an additive which is usually added to chutneys in the present technical field. The additive is not particularly as long as it does not interfere with the good flavor of caramelized onion, and examples thereof include a spice, a colorant, a flavor, a sweetener, a bittering agent, an acidifier, a umami seasoning, a fermented seasoning, a hydrolyzed protein, a preservative, an antifungal agent, an antioxidant, an emulsifier, a pH adjuster, lye water, a thickening agent, enzyme, a manufacturing agent, a nutrition enhancer and alum.

The package in which the caramelized onion chutney is to be placed may be in the form of a pouch having pressure and heat resistance (hereinafter "pressure and heat resistant pouch") or a package. Those made of paper, can, coating paper, plastic such as PET and PTP, metal such as aluminum and glass may be used. It is preferable that the package has resistance to heating under pressure conditions such as retorting. A commercially available package may also be optionally used.

The package in which the caramelized onion chutney is to be placed has an oxygen permeability of preferably 0.1 mL/m$^2$/day/MPa or more, more preferably 0.3 mL/m$^2$/day/MPa or more, further preferably 0.5 mL/m$^2$/day/MPa or more, still more preferably 1.0 mL/m$^2$/day/MPa or more, still further preferably 10.0 mL/m$^2$/day/MPa or more, yet more preferably 20.0 mL/m$^2$/day/MPa or more, and yet further preferably 30.0 mL/m$^2$/day/MPa or more. The package has an oxygen permeability of preferably 100 mL/m$^2$/day/MPa or less, and more preferably 60 mL/m$^2$/day/MPa or less. A package formed of a sheet of, for example, PET (polyester)/NY (nylon)/CPP (unoriented polypropylene), PET/NY/NY/CPP, PET/EVAL (trademark)/NY/CPP, aluminum-deposited PET/NY/CPP and transparent deposited PET/NY/CPP is preferred as the package. More specifically, a package formed of a sheet of, for example, PET12/NY15/CPP100, PET12/NY25/CPP100, PET12/NY15/NY15/CPP100, PET12/EVAL (trademark) 12/NY15/CPP100, aluminum-deposited PET12/NY15/CPP100 and transparent deposited PET12/NY15/CPP100 is preferred as the package. The packaged caramelized onion chutney of the present embodiment includes a product of the Maillard reaction. For the packaged caramelized onion chutney of the present embodiment, the Maillard reaction may proceed in the production including heating under pressure conditions and in the storage period after production. When the amount of carbon dioxide generated by the Maillard reaction in the production of the packaged caramelized onion chutney is small, the gas is dissolved in the caramelized onion chutney in the package, and thus the generation of the gas is not a problem. However, when the Maillard reaction further proceeds during storage, the package may be expanded and this may become a problem. Using a package having an oxygen permeability in the above preferred range is preferred because carbon dioxide gas generated in the package due to the Maillard reaction in the production including heating under pressure conditions and in the storage period is released through the package, and thus the package is not expanded.

The packaged caramelized onion chutney is preferably a food which has been subjected to heating under pressure conditions together with the package, and is typically a retort food. The packaged caramelized onion chutney which has been subjected to heating under pressure conditions together with the package may be distributed at room temperature.

The packaged caramelized onion chutney may be used for seasoning various food materials. For example, it may be added to a sauce such as curry sauce, white sauce, demiglace sauce and meat sauce, and soup, or may be directly put on sausages, baguettes or meat to give good flavor of caramelized onion.

<Method for Producing Packaged Caramelized Onion Chutney>

The method for producing a packaged caramelized onion chutney according to the second embodiment of the present invention comprises the steps of: preparing a raw material mixture comprising onion and lipid, wherein the content of the lipid is 9% by mass or more and 35% by mass or less and the content of water is 20% by mass or more and 70% by mass or less; placing and hermetically sealing the raw material mixture in a package; and heating the raw material mixture in the package under pressure conditions so that the maximum product temperature is 100 to 140° C. and the cooking value is 33 to 80.

According to the method of the present embodiment, a packaged caramelized onion chutney having an improved flavor can be produced due to the Maillard reaction and a reaction of sulfide (an aroma component) in the package in which the raw material mixture is hermetically sealed. Furthermore, the method of the present embodiment provides a packaged caramelized onion chutney with its unique sweet taste and aroma like when onion is roasted enhanced. Moreover, since heating is performed in a hermetically sealed environment, a flavor which ends up evaporating in an open environment can also be obtained. Furthermore, while the open environment involves the problem of burning of onion and long time heating (at 100° C. for 240 minutes), control of temperature is easy and chutney can be prepared in short time without burning of onion in the method of the present embodiment because the raw material is heated under pressure conditions in a closed environment. Moreover, quality can be maintained high and stable without variation in lots. Furthermore, the packaged caramelized onion chutney produced may be distributed at room temperature.

It is preferable that in the raw material mixture, onion is dried onion or concentrated onion prepared by adjusting the moisture content of raw onion. The onion may be in puree, paste, minced (or diced) or sliced form. As used herein, the puree form refers to a form prepared by grinding raw onion. A method of grinding usually used in the present technical field may be used as the method of grinding without limitation. For example, raw onion may be put and ground in a crusher so that the resultant passes through a sieve having an opening of 1.0 mm or less. Furthermore, the paste form refers to a form prepared by concentrating raw onion puree. A method of concentration usually used in the present technical field, such as vacuum concentration, may be used as the method of concentration without limitation. For example, raw onion may be vacuum concentrated on a plate and the like at a temperature of less than 100° C. using a vacuum dryer.

The onion to be mixed in the above raw material mixture is preferably onion with its moisture content adjusted so that the yield is 35% by mass or less. As used herein, the yield means the ratio of the mass of onion after adjusting the moisture content to the mass of raw onion. The lower limit of the yield of the onion mixed to the above raw material mixture may be the solid content or more, and is preferably 12% by mass or more, more preferably 15% by mass or more, and further preferably 20% by mass or more.

The moisture content of onion may be adjusted by drying or concentrating onion at normal pressure or under reduced pressure, or by using a direct heat kneader or a steam kneader, a flat bottom pot, a frying pan, a stockpot and a continuous-type vacuum concentrator. A method usually used in the present technical field may be used as a method for drying or concentrating under reduced pressure without limitation. For example, onion in the respective forms may be put on a plate and the like at a temperature of less than 100° C. to be dried or concentrated under reduced pressure using a vacuum dryer.

The onion to be mixed in the above raw material mixture may be prepared by processing raw onion in-house, or by adjusting the moisture content of processed onion purchased (e.g., dried onion or onion paste), or may be prepared by purchasing a processed product prepared by concentrating raw onion puree.

Preferred examples of lipids are as described in the first embodiment.

When the content of lipid in the raw material mixture is 9% by mass or more and 35% by mass or less and the mixture is heated in a package under predetermined pressure conditions, a caramelized onion chutney with a unique sweet taste and aroma like when onion is roasted can be obtained. Sulfide components, which create the flavor of caramelized onion, are efficiently extracted into lipid, and the presence of lipid provides an efficient site of chemical reaction. Therefore, lipid is considered to improve the aftertaste and koku (richness) of caramelized onion prepared. When the content of lipid is less than 9% by mass, the resultant is like boiled onion, and flavor obtained when onion is roasted cannot be sufficiently given to the caramelized onion chutney. When the content of lipid is more than 35% by mass, the taste of lipid can be detected in the caramelized onion chutney, and the unique koku (richness) of caramelized onion is less likely to be tasted.

The content of lipid in the raw material mixture is preferably 10% by mass or more, more preferably 12% by mass or more, and further preferably 14% by mass or more, and preferably 35% by mass or less, more preferably 30% by mass or less, and further preferably 25% by mass or less.

When the content of water in the raw material mixture is 20% by mass or more and 70% by mass or less and the mixture is heated in a package under predetermined pressure conditions, a caramelized onion chutney with a unique sweet taste and aroma like when onion is roasted can be obtained. When the content of water is less than 20% by mass, and the content of water is more than 70% by mass, the above unique sweet taste and aroma cannot be tasted. The content of water in the raw material mixture is preferably 30% by mass or more, more preferably 40% by mass or more, further preferably 45% by mass or more, and still more preferably 60% by mass or more, and preferably 65% by mass or less.

The origin of water in the raw material mixture is not limited, and may include water in the onion mixed as a raw material, water separately mixed thereto, and water in other raw materials. For example, the content of water in the onion mixed is measured, and then water may be added thereto so that the content of water in the raw material mixture is 20% by mass or more.

In a preferred embodiment of the raw material mixture, the content of onion is 200% by mass or more and 600% by mass or less in terms of raw onion. By heating a raw material mixture having a content of onion in terms of raw onion in that range in a package under pressure conditions, a caramelized onion chutney with a preferred flavor is likely to be obtained. The content of onion in the raw material mixture is preferably 250% by mass or more, and preferably 400% by mass or less and more preferably 300% by mass or less in terms of raw onion.

In a preferred embodiment of the raw material mixture, the content of sucrose is 1.8% by mass or more and 10% by mass or less. By heating a raw material mixture having a content of sucrose in that range in a package under pressure conditions, a caramelized onion chutney with a preferred flavor is likely to be obtained. The content of sucrose in the raw material mixture is preferably 2.2% by mass or more, and more preferably 2.5% by mass or more, and preferably 8% by mass or less, more preferably 7% by mass or less and further preferably 4% by mass or less. When the content of sucrose in the raw material mixture is less than 1.8% by mass, the Maillard reaction is less likely to proceed in heating under pressure conditions or in the storage period, and thus the problem of expansion of packages described later is less likely to arise, but a preferred flavor is unlikely to be obtained.

The origin of sucrose in the raw material mixture is not limited, and may include sucrose in the onion mixed as a raw material, sucrose separately mixed thereto, and sucrose in other raw materials. For example, the content of sucrose in the onion mixed is measured, and then sucrose may be added thereto so that the content of sucrose in the raw material mixture is 1.8% by mass or more.

All of the content of lipid, the content of water and the content of sucrose in the raw material mixture may be measured by the method described in the above "Analytical methods for nutrients; Annex Analytical methods for nutrients Food Labeling Act General Rules, the Consumer Affairs Agency" mentioned in the first embodiment.

The raw material mixture may include an additive which is usually added to chutneys in the present technical field. The additive is as described in the first embodiment.

A preferred embodiment of the package in which the raw material mixture is to be placed and hermetically sealed is as described for the packaged caramelized onion chutney according to the second embodiment.

The package in which the raw material mixture is to be placed and hermetically sealed is particularly preferably a package having oxygen permeability in the above preferred range as described for the packaged caramelized onion chutney according to the second embodiment. In the present embodiment, the Maillard reaction proceeds in the production when the raw material mixture is heated under pressure conditions together with the package and in the storage period of the packaged caramelized onion chutney produced. When the amount of carbon dioxide resulting from the Maillard reaction in the production of the packaged caramelized onion chutney is small, the gas is dissolved in the caramelized onion chutney in the package, and thus the generation of the gas is not a problem. However, when the Maillard reaction further proceeds during storage, the package may be expanded and this may become a problem. Using a package having an oxygen permeability in the above preferred range is preferred because carbon dioxide gas generated in the package due to the Maillard reaction in the production including heating under pressure conditions and in the storage period is released through the package, and thus the package is not expanded.

Next, the raw material mixture in the package is heated under pressure conditions so that the maximum product temperature is 100 to 140° C. and the cooking value is 33 to 80.

As used herein, the "cooking value" is a parameter indicating the amount of heating. When the temperature of heating is high and the time of heating under pressure conditions is long, the cooking value is high. The standard temperature and the Z value need to be fixed so as to compare amounts of heating in various heating conditions, while the values vary depending on the target. More specifically, the cooking value is obtained by integrating a value represented by the following equation (hereinafter referred to as CV) with the time of heating under pressure conditions (minute).

(Equation): $CV = 10^{\{(Product\ temperature - standard\ temperature)/Z\ value\}}$ In the present description, the Z value is 30° C. and the standard temperature is 120° C.

The product temperature A (° C.) of the raw material mixture in the package is measured N times (N is 2 or more) at a plurality of times including the time of the start of heating under pressure conditions. The product temperature A (° C.) from the (n−1)th measurement to nth measurement can be regarded as being kept constant at the temperature measured at the nth measurement (n is 2 or more and N or less). Using the relation between the product temperature A (° C.) and the time of heating under pressure conditions (minute) obtained as described above, CV is integrated with the time of heating under pressure conditions (minute) to determine the cooking value. Furthermore, when the raw material mixture is heated under pressure conditions so that the product temperature A (° C.) of the raw material mixture in the package is constant, the product temperature A (° C.) remains a constant throughout the period of heating under pressure conditions, and the product of CV and the time of under pressure conditions (minute) is a cooking value.

More specifically, the cooking value may be calculated by measuring the product temperature at regular intervals, for example, every minute, during heating under pressure conditions. For example, suppose the product temperature (° C.) at 7 points in time including the start during heating under pressure conditions for 6 minutes is as described in Table 1. The product temperature A (° C.) from the (n−1)th measurement to the nth measurement is regarded as being kept constant at the temperature measured at the nth measurement (n is 2 or more and 7 or less).

TABLE 1

| Time of heating (minute) | Product temperature (° C.) | CV | Integrated value |
| --- | --- | --- | --- |
| 0 | 20 | 0.0 | 0.0 |
| 1 | 120 | 1.0 | 1.0 |
| 2 | 130 | 2.2 | 3.2 |
| 3 | 140 | 4.6 | 7.8 |

TABLE 1-continued

| Time of heating (minute) | Product temperature (° C.) | CV | Integrated value |
| --- | --- | --- | --- |
| 4 | 140 | 4.6 | 12.4 |
| 5 | 100 | 0.2 | 12.6 |
| 6 | 30 | 0.0 | 12.6 |

In the case of heating under pressure conditions shown in Table 1, the cooking value, which is an integrated value of CV for 0 to 6 minutes, is calculated as 12.6.

The cooking value may be 33 to 80. When the cooking value is less than 33, the Maillard reaction does not proceed sufficiently and the flavor of caramelized onion is difficult to be obtained. When the cooking value is more than 80, the Maillard reaction proceeds excessively and the resultant tastes burnt. The cooking value is preferably 35 or more, more preferably 45 or more, preferably 70 or less, and more preferably 65 or less. Meanwhile when heating under pressure conditions is performed at a cooking value of 33 to 88, the Maillard reaction is facilitated in the production and in the storage period of caramelized onion in a package, sometimes resulting in the problem of expansion of the package. This problem can be solved by using a package having an oxygen permeability in the above preferred range.

The maximum product temperature in heating under pressure conditions may be 100 to 140° C., and preferably 110 to 130° C.

The heating under pressure conditions with the above requirement may be performed using a retort processor or a pressure vessel.

In the following the present invention will be described in detail with reference to Examples, but the scope of the present invention is not limited to these Examples.

EXAMPLES

<Experiment 1>
<Raw Onion>

Raw onion with a moisture content of 90.00% by mass, a solid content of 10.00% by mass and a content of sucrose in terms of the whole raw onion of 0.99% by mass was basically used.

In Example 3 and Example 6, raw onion with a moisture content of 93.20% by mass, a solid content of 6.80% by mass and a content of sucrose in terms of the whole raw onion of 0.99% by mass was used.

In Example 13, raw onion with a moisture content of 90.00% by mass, a solid content of 10.00% by mass and a content of sucrose in terms of the whole raw onion of 2.04% by mass was used.

In Comparative Example 7, raw onion with a moisture content of 90.00% by mass, a solid content of 10.00% by mass and a content of sucrose in terms of the whole raw onion of 0.54% by mass was used.

<Preparation of Raw Material Mixture>

In Examples 1 to 8, 13, 15 to 17 and Comparative Examples 1 to 8, chopped raw onion was put on a stainless steel tray and the tray was put on a plate at 80° C. in a vacuum dryer ("Freeze Dryer" Model RLEII-204 made by Kyowa Vacuum Engineering, Co., Ltd.). The raw onion was vacuum concentrated under a reduced pressure of 13.3 Pa or less to prepare concentrated onion at a predetermined yield. Palm oil was added thereto in a predetermined formulation to prepare a raw material mixture. As used herein, the "yield" means the ratio of the weight of concentrated onion (%) to the weight of chopped raw onion.

In Example 9, raw onion was directly pureed and an appropriate amount of palm oil was added, and the mixture was roasted in a flat bottom pot to prepare a concentrated onion at a predetermined yield. Palm oil was added thereto in a predetermined formulation to prepare a raw material mixture. The amount of palm oil used for roasting is included in the "amount of palm oil added (parts by mass)" in the following Tables 2 to 6.

In Example 10, palm oil was added to an onion paste with a yield of 25% (product name Onion paste made by Cedenco) in a predetermined formulation to prepare a raw material mixture.

In Example 11, palm oil was added to frozen saute onion with a yield of 35% (product name Saute onion made by Osaka Marukita Shoji Co., Ltd.) in a predetermined formulation to prepare a raw material mixture.

In Example 12, palm oil and water were added to dried onion (product name Onion Chop made by Kisai Foods Ind. Co., Ltd.) in a predetermined formulation to prepare a raw material mixture.

In Example 14, palm oil and water were added to onion paste with a yield of 25% (product name Onion paste made by Cedenco) in a predetermined formulation to prepare a raw material mixture.

In Example 18, palm oil was added to chopped raw onion and the mixture was roasted in a flat bottom pot to prepare a concentrated onion with a predetermined yield. Palm oil was added thereto in a predetermined formulation to prepare a raw material mixture. The amount of palm oil used for roasting is included in the "amount of palm oil added (parts by mass)" in the following Tables 2 to 6.

<Pressure and Heat Resistant Pouch>

A pressure and heat resistant pouch made of the following respective package materials was used.

Package material 1: Pressure and heat resistant pouch made of an ethylene-vinyl alcohol copolymer resin film (PET12/EVAL (trademark) 12/NY15/CPP100) having an oxygen permeability of 1 mL/m$^2$/day/MPa.

Package material 2: Pressure and heat resistant pouch made of a nylon film (PET12/NY25/CPP100) having an oxygen permeability of 30 mL/m$^2$/day/MPa.

Package material 3: Pressure and heat resistant pouch made of an aluminum deposited film (aluminum deposited PET12/NY15/CPP100) having an oxygen permeability of 1 mL/m$^2$/day/MPa.

Package material 4: Pressure and heat resistant pouch made of a transparent deposited film (transparent deposited PET12/NY15/CPP100) having an oxygen permeability of 0.3 mL/m$^2$/day/MPa.

Package material 5: Pressure and heat resistant pouch made of an aluminum laminate film (PET12/NY15/AL7/CPP70) having an oxygen permeability of 0 mL/m$^2$/day/MPa.

<Heating Under Pressure Conditions>

100 g of the raw material mixture was placed in a sufficiently large pressure and heat resistant pouch, and the pouch was hermetically sealed to avoid entry of air as much as possible and to be very thin, and heated under pressure conditions so that the cooking value was 25, 35, 55, 60, 70 or 100 to prepare a caramelized onion chutney.

The cooking value and the temperature and the time of heating under pressure conditions are as follows.

Cooking value 25: temperature 120° C., 25 minutes
Cooking value 35: temperature 120° C., 35 minutes
Cooking value 55: temperature 120° C., 55 minutes
Cooking value 60: temperature 120° C., 60 minutes
Cooking value 70: temperature 120° C., 70 minutes
Cooking value 100: temperature 120° C., 100 minutes As described above, a predetermined amount (100 g) of a raw material mixture prepared by mixing 100 parts by mass of the above onion in terms of raw onion and oil/fat in parts by mass shown in the following Tables 2 to 6 is placed in the pressure and heat resistant pouch, and heated under pressure conditions. Thus, the content of oil/fat, the content of water, the solid content of onion, the content in terms of raw onion and the content of sucrose vary in the above predetermined amount of the raw material mixture placed in the pressure and heat resistant pouch and in the final caramelized onion chutney after heating depending on the solid content and the content of sucrose in the raw material onion, and the yield of the onion.

Regarding Examples and Comparative Examples, the amount of onion used (parts by weight in terms of raw onion), the onion used, the method of concentration if onion was concentrated before mixing to the raw material mixture, the yield of onion mixed to the raw material mixture relative to raw onion (%), the amount of palm oil added (parts by weight), and the amount of water added (parts by weight) are shown in the following Tables 2 to 6. In addition, the content of oil/fat (% by mass), the content of water (% by mass), the content of onion in terms of raw onion (% by mass) and the content of sucrose (% by mass) in the final caramelized onion chutney are shown in the same tables. The solid content and the content of sucrose in the raw onion of the raw material are as described above.

<Evaluation>

Sensory evaluation of the chutneys of Examples 1 to 18 and Comparative Examples 1 to 8 was performed by three panelists. The panelists evaluated the "flavor" on a scale of 1 to 5 based on the following criteria, and the average was rounded off to the first decimal place. The sensory evaluation was performed immediately after the production of the packaged chutneys.

1: No koku (richness), not like caramelized onion
2: Lacking koku (richness) of caramelized onion
3: Having unique koku (richness) of caramelized onion
4: Tasting good with unique koku (richness) of caramelized onion
5: Very strong unique koku (richness) of caramelized onion The same panelists also visually observed the state of expansion of the pressure and heat resistant pouch immediately after the production of the packaged chutneys. The panelists evaluated the state of expansion on a scale of 1 to 5 based on the following criteria and the average was rounded off to the first decimal place.

1: Gas generated, and the pouch significantly expanded and seeming like spoiled.
2: Gas generated, and the pouch expanded and looking unusual
3: Gas generated, and the pouch slightly expanded but not noticeable
4: Generation of gas visually observed, but no expansion
5: Little generation of gas after heating under pressure conditions, no expansion <Results>

The results are shown in Tables 2 to 6.

In Examples 1 to 18 in which the content of oil/fat was 10.71 to 33.33% by mass and the content of water of 23.81 to 68.78% by mass, caramelized onion chutneys with koku (richness) with a score of the flavor of 3 or more were obtained. By contrast, in all of Comparative Example 1 in which the content of oil/fat was 37.50%, Comparative Example 2 in which the content of oil/fat was 4.76, Comparative Example 3 in which the content of water was 71.43%, and Comparative Example 4 in which the content of water was 15.79%, the score of the flavor was 2, and chutney having koku (richness) was not obtained.

In all of Examples 1 to 18, the content of onion was 222.22 to 588.24% by mass in terms of raw onion and the content of sucrose was 2.20 to 9.71% by mass. By contrast, in both of Comparative Example 3 in which the content of onion was 178.57% by mass in terms of raw onion and the content of sucrose was 1.77% by mass and Comparative Example 7 in which the content of sucrose was 1.50% by mass, the score of the flavor was 2, and chutney having koku (richness) was not obtained.

The cooking value was in the range of 35 to 70 in all of Examples 1 to 18. In Comparative Example 5 in which the composition was the same as that of Example 1 and the cooking value was 25, chutney having koku (richness) was not obtained. The product of Comparative Example 6 in which the composition was also the same as that of Example 1 and the cooking value was 100 had a slightly "burnt flavor" and was strongly sour.

The flavor was substantially the same and good in all of Examples 1, 18, in which concentrated onion prepared from chopped onion was used, Example 9, in which composition was the same or substantially the same except for using concentrated onion prepared from onion puree, Examples 10, 14, in which commercially available onion paste was used, Example 11, in which commercially available frozen saute onion was used, and Example 12, in which commercially available dried onion was used.

As shown in Table 6, while the compositions of Examples 15, 16, 17 and Comparative Example 8 are the same as that of Example 1, the package material of the pressure and heat resistant pouch is different from that of Example 1, and thus has a different oxygen permeability. In Example 1 in which package material 1 having an oxygen permeability of 1 mL/m$^2$/day/MPa was used and Example 15 in which package material 2 having an oxygen permeability of 30 mL/m$^2$/day/MPa was used, there is little gas in the pouch, and no expansion of the pouch was observed. Meanwhile, in Example 16 in which package material 3 having an oxygen permeability of 1 mL/m$^2$/day/MPa was used and Example 17 in which package material 4 having an oxygen permeability of 0.3 mL/m$^2$/day/MPa was used, a small amount of gas was found in the pouch and the pouch was slightly expanded, but the product was acceptable. By contrast, in Comparative Example 8 in which package material 5 having an oxygen permeability of 0 mL/m$^2$/day/MPa was used, the pouch was expanded due to gas.

TABLE 2

|  | Example 1 | Example 2 | Example 3 | Example 4 | Example 5 |
|---|---|---|---|---|---|
| Amount of onion used (parts by weight in terms of raw onion) | 100 | 100 | 100 | 100 | 100 |
| Onion used | Raw onion (chopped) | Raw onion (chopped) | Raw onion (chopped) | Raw onion (chopped) | Raw onion (chopped) |
| Concentration | Vacuum concentration | Vacuum concentration | Vacuum concentration | Vacuum concentration | Vacuum concentration |
| Yield (%) | 30 | 15 | 35 | 30 | 30 |
| Amount of palm oil added (parts by weight) | 6 | 6 | 6 | 15 | 3.6 |
| Amount of water added (parts by weight) | 0 | 0 | 0 | 0 | 0 |
| <Composition of final chutney> | | | | | |
| Oil/fat (% by mass) | 16.67 | 28.57 | 14.63 | 33.33 | 10.71 |
| Moisture content (% by mass) | 55.56 | 23.81 | 68.78 | 44.44 | 59.52 |
| Onion in terms of raw onion (% by mass) | 277.78 | 476.19 | 243.90 | 222.22 | 297.62 |
| Sucrose (% by mass) | 2.75 | 4.71 | 2.41 | 2.20 | 2.95 |
| Cooking value | 60 | 60 | 60 | 60 | 60 |
| Package material | Package material 1 | Package material 1 | Package material 1 | Package material 1 | Package material 1 |
| Oxygen permeability (mL/m2/day/MPa) | 1 | 1 | 1 | 1 | 1 |
| Evaluation | | | | | |
| Flavor | 5 Having lasting koku (richness) of caramelized onion | 3 Close to "fried" onion but having lasting koku (richness) | 3 Having weak but lasting koku (richness) of caramelized onion | 4 Slightly oily but having koku (richness) of caramelized onion | 4 Like boiled onion but having koku (richness) of caramelized onion |
| Expansion of pouch | 5 Little gas or no expansion of pouch | 5 Little gas or no expansion of pouch | 5 Little gas or no expansion of pouch | 5 Little gas or no expansion of pouch | 5 Little gas or no expansion of pouch |

TABLE 3

|  | Example 6 | Example 7 | Example 8 | Example 9 | Example 10 |
| --- | --- | --- | --- | --- | --- |
| Amount of onion used (parts by weight in terms of raw onion) | 100 | 100 | 100 | 100 | 100 |
| Onion used | Raw onion (chopped) | Raw onion (chopped) | Raw onion (chopped) | Raw onion (puree) | Concentrated paste material |
| Concentration | Vacuum concentration | Vacuum concentration | Vacuum concentration | Concentration by roasting | — |
| Yield (%) | 12 | 30 | 30 | 25 | 25 |
| Amount of palm oil added (parts by weight) | 5 | 6 | 6 | 6 | 6 |
| Amount of water added (parts by weight) | 0 | 0 | 0 | 0 | 0 |
| <Composition of final chutney> | | | | | |
| Oil/fat (% by mass) | 29.41 | 16.67 | 16.67 | 19.35 | 19.35 |
| Moisture content (% by mass) | 30.59 | 55.56 | 55.56 | 48.39 | 48.39 |
| Onion in terms of raw onion (% by mass) | 588.24 | 277.78 | 277.78 | 322.58 | 322.58 |
| Sucrose (% by mass) | 5.82 | 2.75 | 2.75 | 3.19 | 3.19 |
| Cooking value | 60 | 35 | 70 | 60 | 60 |
| Package material | Package material 1 | Package material 1 | Package material 1 | Package material 1 | Package material 1 |
| Oxygen permeability (mL/m2/day/MPa) | 1 | 1 | 1 | 1 | 1 |
| Evaluation | | | | | |
| Flavor | 3 Close to "fried" onion but having lasting koku (richness) | 4 Having weak koku (richness) of caramelized onion | 4 Slightly sour but preferred koku (richness) of caramelized onion detected | 5 Having lasting koku (richness) of caramelized onion | 5 Having lasting koku (richness) of caramelized onion |
| Expansion of pouch | 5 Little gas or no expansion of pouch | 5 Little gas or no expansion of pouch | 5 Little gas or no expansion of pouch | 5 Little gas or no expansion of pouch | 5 Little gas or no expansion of pouch |

TABLE 4

|  | Example 11 | Example 12 | Example 13 | Example 18 | Comparative Example 1 | Comparative Example 2 |
| --- | --- | --- | --- | --- | --- | --- |
| Amount of onion used (parts by weight in terms of raw onion) | 100 | 100 | 100 | 100 | 100 | 100 |
| Onion used | Frozen saute onion | Dried onion | Raw onion (chopped) | Raw onion (chopped) | Raw onion (chopped) | Raw onion (chopped) |
| Concentration | — | — | Vacuum concentration | Concentration by roasting | Vacuum concentration | Vacuum concentration |
| Yield (%) | 30 | 10 | 15 | 30 | 30 | 30 |
| Amount of palm oil added (parts by weight) | 6 | 6 | 6 | 6 | 18 | 1.5 |
| Amount of water added (parts by weight) | 0 | 20 | 0 | 0 | 0 | 0 |
| <Composition of final chutney> | | | | | | |
| Oil/fat (% by mass) | 16.67 | 16.67 | 28.57 | 16.67 | 37.50 | 4.76 |
| Moisture content (% by mass) | 55.56 | 55.56 | 23.81 | 55.56 | 41.67 | 63.49 |
| Onion in terms of raw onion (% by mass) | 277.78 | 277.78 | 476.19 | 277.78 | 208.33 | 317.46 |
| Sucrose (% by mass) | 2.75 | 2.75 | 9.71 | 2.75 | 2.06 | 3.14 |
| Cooking value | 60 | 60 | 60 | 60 | 60 | 60 |
| Package material | Package material 1 | Package material 1 | Package material 1 | Package material 1 | Package material 1 | Package material 1 |
| Oxygen permeability (mL/m2/day/MPa) | 1 | 1 | 1 | 1 | 1 | 1 |

TABLE 4-continued

|  | Example 11 | Example 12 | Example 13 | Example 18 | Comparative Example 1 | Comparative Example 2 |
| --- | --- | --- | --- | --- | --- | --- |
| Evaluation | | | | | | |
| Flavor | 5<br>Having lasting koku (richness) of caramelized onion | 5<br>Having lasting koku (richness) of caramelized onion | 3<br>Close to "fried" onion but having lasting koku (richness) | 5<br>Having lasting koku (richness) of caramelized onion | 2<br>Oily and no lasting koku (richness) | 2<br>Nothing more than boiled onion |
| Expansion of pouch | 5<br>Little gas or no expansion of pouch | 5<br>Little gas or no expansion of pouch | 5<br>Little gas or no expansion of pouch | 5<br>Little gas or no expansion of pouch | 5<br>Little gas or no expansion of pouch | 5<br>Little gas or no expansion of pouch |

TABLE 5

|  | Comparative Example 3 | Comparative Example 4 | Comparative Example 5 | Comparative Example 6 | Comparative Example 7 |
| --- | --- | --- | --- | --- | --- |
| Amount of onion used (parts by weight in terms of raw onion) | 100 | 100 | 100 | 100 | 100 |
| Onion used | Raw onion (chopped) | Raw onion (chopped) | Raw onion (chopped) | Raw onion (chopped) | Raw onion (chopped) |
| Concentration | Vacuum concentration | Vacuum concentration | Vacuum concentration | Vacuum concentration | Vacuum concentration |
| Yield (%) | 50 | 13 | 30 | 30 | 30 |
| Amount of palm oil added (parts by weight) | 6 | 6 | 6 | 6 | 6 |
| Amount of water added (parts by weight) | 0 | 0 | 0 | 0 | 0 |
| <Composition of final chutney> | | | | | |
| Oil/fat (% by mass) | 10.71 | 31.58 | 16.67 | 16.67 | 16.67 |
| Moisture content (% by mass) | 71.43 | 15.79 | 55.56 | 55.56 | 55.56 |
| Onion in terms of raw onion (% by mass) | 178.57 | 526.32 | 277.78 | 277.78 | 277.78 |
| Sucrose (% by mass) | 1.77 | 5.21 | 2.75 | 2.75 | 1.50 |
| Cooking value | 60 | 60 | 25 | 100 | 60 |
| Package material | Package material 1 | Package material 1 | Package material 1 | Package material 1 | Package material 1 |
| Oxygen permeability (mL/m2/day/MPa) | 1 | 1 | 1 | 1 | 1 |
| Evaluation | | | | | |
| Flavor | 2<br>Nothing more than boiled onion | 2<br>Like fried onion and no lasting koku (richness) | 2<br>Weak koku (richness) of caramelized onion | 2<br>Tasting slightly "burnt flavor" and strongly sour | 2<br>No koku (richness) of onion at all |
| Expansion of pouch | 5<br>Little gas or no expansion of pouch | 5<br>Little gas or no expansion of pouch | 5<br>Little gas or no expansion of pouch | 5<br>Little gas or no expansion of pouch | 5<br>Little gas or no expansion of pouch |

TABLE 6

|  | Example 1 | Example 14 | Example 15 | Example 16 | Example 17 | Comparative Example 8 |
| --- | --- | --- | --- | --- | --- | --- |
| Amount of onion used (parts by weight in terms of raw onion) | 100 | 100 | 100 | 100 | 100 | 100 |
| Onion used | Raw onion (chopped) | Concentrated paste material | Raw onion (chopped) | Raw onion (chopped) | Raw onion (chopped) | Raw onion (chopped) |
| Concentration | Vacuum concentration | — | Vacuum concentration | Vacuum concentration | Vacuum concentration | Vacuum concentration |

TABLE 6-continued

|  | Example 1 | Example 14 | Example 15 | Example 16 | Example 17 | Comparative Example 8 |
|---|---|---|---|---|---|---|
| Yield (%) | 30 | 25 | 30 | 30 | 30 | 30 |
| Amount of palm oil added (parts by weight) | 6 | 5.5 | 6 | 6 | 6 | 6 |
| Amount of water added (parts by weight) | 0 | 2.5 | 0 | 0 | 0 | 0 |
| <Composition of final chutney> | | | | | | |
| Oil/fat (% by mass) | 16.67 | 16.67 | 16.67 | 16.67 | 16.67 | 16.67 |
| Moisture content (% by mass) | 55.56 | 55.45 | 55.56 | 55.56 | 55.56 | 55.56 |
| Onion in terms of raw onion (% by mass) | 277.78 | 303.03 | 277.78 | 277.78 | 277.78 | 277.78 |
| Sucrose (% by mass) | 2.75 | 3.00 | 2.75 | 2.75 | 2.75 | 2.75 |
| Cooking value | 60 | 55 | 60 | 60 | 60 | 60 |
| Package material | Package material 1 | Package material 2 | Package material 2 | Package material 3 | Package material 4 | Package material 5 |
| Oxygen permeability (mL/m2/day/MPa) | 1 | 30 | 30 | 1 | 0.3 | 0 |
| Evaluation | | | | | | |
| Flavor | 5 Having lasting koku (richness) of caramelized onion | 5 Having lasting koku (richness) of caramelized onion | 5 Having lasting koku (richness) of caramelized onion | 5 Having lasting koku (richness) of caramelized onion | 5 Having lasting koku (richness) of caramelized onion | 5 Having lasting koku (richness) of caramelized onion |
| Expansion of pouch | 5 Little gas or no expansion of pouch | 5 Little gas or no expansion of pouch | 5 Little gas or no expansion of pouch | 3 Small amount of gas and small expansion of pouch | 3 Small amount of gas and small expansion of pouch | 1 Gas generated and pouch expanded |

<Experiment 2>

A packaged caramelized onion chutney was prepared using, as a retort pouch, a pressure and heat resistant pouch made of an aluminum laminate film having an oxygen permeability of 0 mL/m²/day/MPa (package material 5) or a pressure and heat resistant pouch made of an ethylene-vinyl alcohol copolymer resin film having an oxygen permeability of 1 mL/m²/day/MPa (package material 1), which are described in Experiment 1, under the following conditions.

Condition 1: A packaged caramelized onion chutney was prepared in the same manner as in Comparative Example 5 except for using package material 5 (temperature 120° C., cooking value 25).

Condition 2: A packaged caramelized onion chutney was prepared in the same manner as in Example 7 except for using package material 5 (temperature 120° C., cooking value 35).

Condition 3: A packaged caramelized onion chutney was prepared in the same manner as in Comparative Example 8 (in which package material 5 was used) (temperature 120° C., cooking value 60).

Condition 4: A packaged caramelized onion chutney was prepared in the same manner as in Example 1 (in which package material 1 was used) (temperature 120° C., cooking value 60).

For Conditions 1 to 3, only the time of heating under pressure conditions and the corresponding cooking value are different. The composition of the raw material mixture (16.67% by mass of oil/fat, 55.56% by mass of water, 277.78% by mass of onion in terms of raw onion, 2.75% by mass of sucrose) is the same, and the same package material 5 is used.

For Conditions 3 and 4, only the package material used is different and the composition of the raw material mixture and the condition of heating under pressure conditions are the same.

The state of expansion of the package was observed immediately after the production of the packaged caramelized onion chutney under conditions 1 to 4 and after storing at 40° C. for 1 month, and the products were evaluated on a scale of 1 to 5 based on the same criteria as in the evaluation immediately after the production in Experiment 1. The results of evaluation are shown in the following table.

TABLE 7

| | Cooking value | Package material | Expansion of package immediately after preparation | Expansion of package after storing at 40° C. for 1 month |
|---|---|---|---|---|
| Condition 1 | 25 | 5 | 5 Not expanded | 5 Not expanded |
| Condition 2 | 35 | 5 | 3 Slightly expanded | 1 Expanded |
| Condition 3 | 60 | 5 | 1 Expanded | 1 Significantly expanded |
| Condition 4 | 60 | 1 | 5 Not expanded | 5 Not expanded |

For the packaged caramelized onion chutney which was prepared under condition 1 in which package material 5 was used and the cooking value was 25 (less than 33), expansion of the package was not observed even immediately after the production and after storing at 40° C. for 1 month.

For the packaged caramelized onion chutney which was prepared under condition 2 in which package material 5 was used and the cooking value was 35, a small expansion of the package was observed immediately after the production, but this did not affect the quality of the product. However, a larger expansion was observed after storing at 40° C. for 1 month.

For the packaged caramelized onion chutney which was prepared under condition 3 in which package material 5 was used and the cooking value was 60, expansion of the package was observed immediately after the production. A significant expansion was observed after storing at 40° C. for 1 month.

For the packaged caramelized onion chutney which was prepared under condition 4 in which package material 1 was used and the cooking value was 60, expansion of the package was not observed immediately after the production and after storing at 40° C. for 1 month.

The above results of Experiment 2 show that high cooking value in heating under pressure conditions is likely to facilitate the Maillard reaction in the production and storage, and use of package material 1 suppresses expansion of packages.

All publications, patents and patent applications cited in the description are incorporated herein by reference.

The invention claimed is:

1. A packaged caramelized onion chutney comprising:
a caramelized onion chutney comprising onion and lipid, wherein
a content of the lipid is 9% by mass or more and 35% by mass or less relative to a total weight of the chutney,
a content of water is 20% by mass or more and 70% by mass or less relative to a total weight of the chutney,
a content of sucrose is 1.8% by mass or more and 10% by mass or less relative to a total weight of the chutney, and
a content of onion in the chutney is 200% by mass or more and 600% by mass or less in terms of raw onion; and
a package in which the chutney is sealed, wherein the package has an oxygen permeability of 0.1 mL/m²/day/MPa or more and 100 mL/m²/day/MPa or less,
wherein the chutney is prepared by heating under pressure conditions in the package so that the maximum product temperature is 100 to 140° C. and
a cooking value of the chutney is 33 to 80, in which the cooking value is obtained by integrating a value represented by an equation, with a time of heating [minute], wherein the equation is $10^{\{(A-120)/30\}}$, in which A is a product temperature (A) (° C.).

2. A method for producing the packaged caramelized onion chutney of claim 1, the method comprising the steps of:
preparing a raw material mixture comprising onion and lipid, wherein the content of the lipid is 9% by mass or more and 35% by mass or less relative to a total weight of the chutney, and the content of water is 20% by mass or more and 70% by mass or less relative to a total weight of the chutney, and the content of sucrose in the raw material mixture is 1.8% by mass or more and 10% by mass or less relative to a total weight of the chutney;
placing and hermetically sealing the raw material mixture in a package, wherein the package has an oxygen permeability of 0.1 mL/m²/day/MPa or more and 100 ml/m²/day/MPa or less; and
heating the raw material mixture in the package under pressure conditions so that the maximum product temperature is 100 to 140° C. and the cooking value is 33 to 80.

3. The method according to claim 2, wherein
the moisture content of onion is adjusted so that the yield is 35% by mass or less, and wherein
the content of onion in the raw material mixture is 200% by mass or more and 600% by mass or less in terms of raw onion.

4. The packaged caramelized onion chutney according to claim 1, wherein the package comprises an ethylene-vinyl alcohol copolymer resin film.

5. The packaged caramelized onion chutney according to claim 1, wherein the package comprises nylon film.

6. The packaged caramelized onion chutney according to claim 1, wherein the package comprises an aluminum deposited film.

7. The packaged caramelized onion chutney according to claim 1, wherein the package comprises a transparent deposited film.

8. The packaged caramelized onion chutney according to claim 1, wherein the package excludes an aluminum laminate film.

9. The packaged caramelized onion chutney according to claim 1, wherein the content of the lipid is 14% by mass or more and 25% by mass or less relative to a total weight of the chutney.

10. The packaged caramelized onion chutney according to claim 1, wherein the content of sucrose is 2% by mass or more and 7% by mass or less relative to a total weight of the chutney.

11. The packaged caramelized onion chutney according to claim 1, wherein the oxygen permeability is of 0.3 mL/m²/day/MPa or more and 100 mL/m²/day/MPa or less.

12. The packaged caramelized onion chutney according to claim 1, wherein the oxygen permeability is of 0.1 mL/m²/day/MPa or more and 60 mL/m²/day/MPa or less.

13. The packaged caramelized onion chutney according to claim 1, wherein the oxygen permeability is of 1 mL/m²/day/MPa or more and 60 mL/m²/day/MPa or less.

14. The packaged caramelized onion chutney according to claim 1, wherein the cooking value of the chutney is 35 to 60.

15. The packaged caramelized onion chutney according to claim 1, wherein the maximum product temperature is 110 to 130° C.

16. The method according to claim 2, wherein the package comprises at least one selected from the group consisting of an ethylene-vinyl alcohol copolymer resin film, a nylon film, an aluminum deposited film, a transparent deposited film.

* * * * *